United States Patent
Abe et al.

(10) Patent No.: US 12,358,268 B2
(45) Date of Patent: Jul. 15, 2025

(54) LAMINATING DEVICE

(71) Applicants: Panasonic Holdings Corporation, Osaka (JP); TOYOTA JIDOSHA KABUSHIKI KAISHA, Aichi-ken (JP)

(72) Inventors: Ryuta Abe, Osaka (JP); Yukihiro Maegawa, Osaka (JP); Naoto Hosotani, Osaka (JP); Takahiro Kuhara, Toyota (JP)

(73) Assignees: PANASONIC HOLDINGS CORPORATION, Osaka (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 209 days.

(21) Appl. No.: 18/011,749

(22) PCT Filed: Jun. 21, 2021

(86) PCT No.: PCT/JP2021/023464
§ 371 (c)(1),
(2) Date: Dec. 20, 2022

(87) PCT Pub. No.: WO2021/261456
PCT Pub. Date: Dec. 30, 2021

(65) Prior Publication Data
US 2023/0271410 A1    Aug. 31, 2023

(30) Foreign Application Priority Data
Jun. 22, 2020  (JP) ................... 2020-107312

(51) Int. Cl.
B29C 65/00    (2006.01)
B32B 37/00    (2006.01)
(Continued)

(52) U.S. Cl.
CPC ...... *B32B 37/0053* (2013.01); *B32B 38/0004* (2013.01); *H01M 10/0404* (2013.01);
(Continued)

(58) Field of Classification Search
CPC ............. B29C 65/7455; B29C 65/785; B29C 65/7852; B32B 38/0004
See application file for complete search history.

(56) References Cited

U.S. PATENT DOCUMENTS 6,523,595 B1 * 2/2003 Milner ............. A61F 13/15756
225/5
8,607,959 B2 * 12/2013 Papsdorf ................ B65H 39/14
198/470.1
8,663,420 B2 * 3/2014 Nakakado ............. B26D 1/405
156/582

FOREIGN PATENT DOCUMENTS

JP    2010-232145 A    10/2010

OTHER PUBLICATIONS

International Search Report issued in corresponding International Application No. PCT/JP2021/023464, dated Jul. 27, 2021, with English translation.

* cited by examiner

*Primary Examiner* — Philip C Tucker
*Assistant Examiner* — Nickolas R Harm
(74) *Attorney, Agent, or Firm* — Rimon P.C.

(57) ABSTRACT

A laminating device includes: a plurality of laminating heads that each holds a unit laminated body; a drum section in which the plurality of laminating heads are arranged, which holds each laminating head swingably via a support shaft, and which rotates to advance each laminating head to a laminating position facing a lamination stage; a cam section which is in contact with each laminating head and which causes each laminating head to swing around the support (Continued)

shaft in association with a movement of each laminating head caused by a rotation of the drum section; and a biasing member that biases each laminating head in a radial direction of the drum section.

6 Claims, 7 Drawing Sheets

(51) Int. Cl.
  *B32B 38/00* (2006.01)
  *H01M 10/04* (2006.01)
  *B29C 65/74* (2006.01)
  *B29C 65/78* (2006.01)
(52) U.S. Cl.
  CPC ........ *B29C 65/7455* (2013.01); *B29C 65/785* (2013.01); *B29C 65/7852* (2013.01); *B32B 2457/10* (2013.01)

LAMINATING DEVICE

CROSS-REFERENCE TO RELATED APPLICATIONS

This application is the U.S. National Phase under 35 U.S.C. § 371 of International Patent Application No. PCT/JP2021/023464, filed on Jun. 21, 2021, which in turn claims the benefit of Japanese Patent Application No. 2020-107312, filed on Jun. 22, 2020, the entire content of each of which is incorporated herein by reference.

BACKGROUND

Field of the Invention

The present disclosure relates to a laminating device.

Description of the Related Art

As in-vehicle batteries, for example, laminate-type batteries have been developed. Such a battery has a structure in which a container contains a laminated electrode assembly, in which multiple positive electrodes and multiple negative electrodes are alternatively laminated with a separator in between, and an electrolyte. It is desired to reduce misalignment of electrode plates as much as possible from the perspective of improvement of battery performance such as ensuring high capacity and high energy density. Meanwhile, patent literature 1, for example, discloses aligning electrode plates by inserting a positioning boss in a through hole provided in each electrode plate for prevention of lamination misalignment.

Patent literature 1: JP2010-232145

When a through hole is provided in an electrode plate, the battery capacity will be reduced in no small measure because an electrode active material is not available in a portion provided with the through hole. Further, interference between the positioning boss and the electrode plate produces damage to the electrode plate or exfoliation of the active material, which could decrease the battery performance.

SUMMARY OF THE INVENTION

The present disclosure has been made in view of such a situation, and a purpose thereof is to provide a technology for improving battery performance.

An embodiment of the present disclosure relates to a laminating device that discharges a unit laminated body in which a separator and an electrode plate are laminated onto a lamination stage and that laminates a plurality of unit laminated bodies. The device includes: a plurality of laminating heads that each holds the unit laminated body; a drum section in which the plurality of laminating heads are arranged, which holds each laminating head swingably via a support shaft, and which rotates to advance each laminating head to a laminating position facing the lamination stage; a cam section which is in contact with each laminating head and which causes each laminating head to swing around the support shaft in association with a movement of each laminating head caused by a rotation of the drum section; and a biasing member that biases each laminating head in a radial direction of the drum section.

Optional combinations of the aforementioned constituting elements, and implementations of the present disclosure in the form of methods, devices, systems, etc. may also be practiced as additional modes of the present disclosure.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
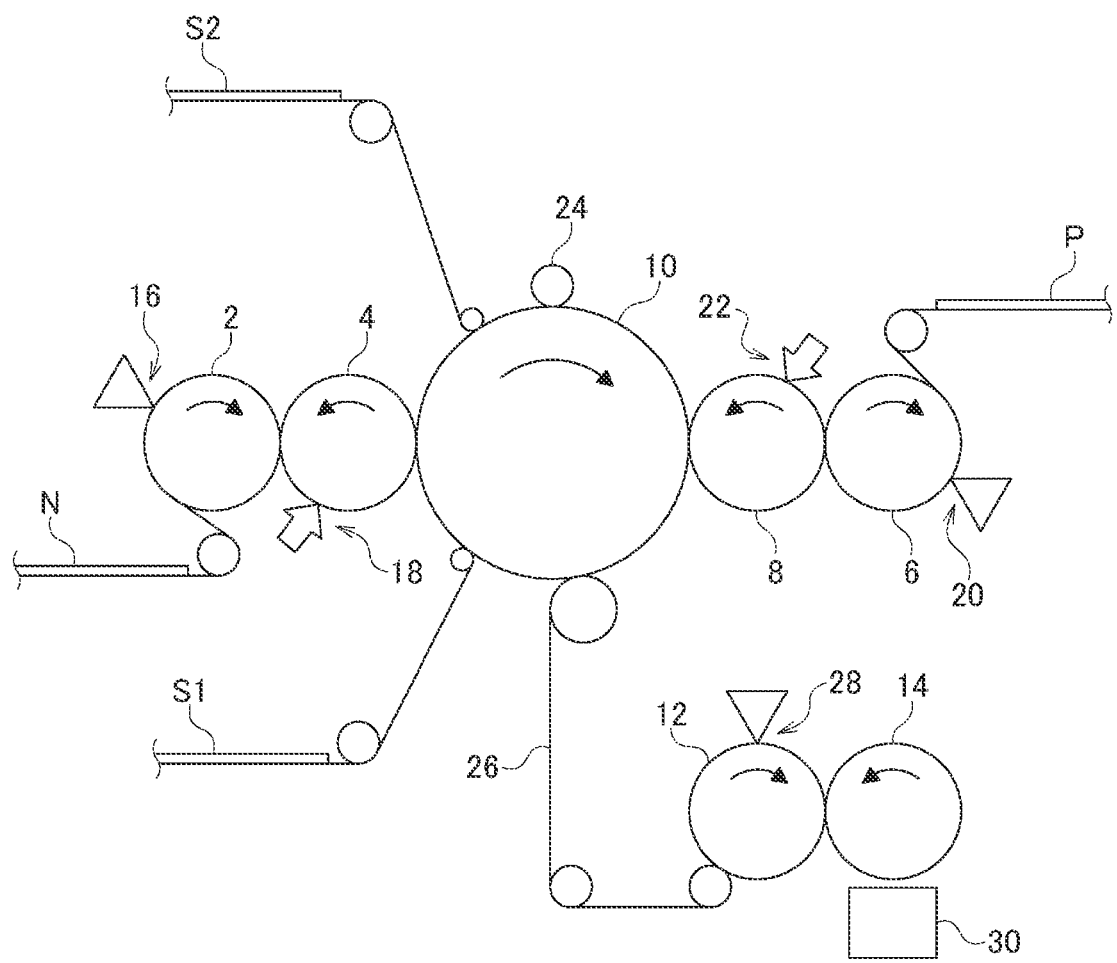
FIG. 1 is a schematic diagram of a laminated electrode assembly manufacturing device according to an embodiment.

Hereinafter, the present disclosure will be described based on preferred embodiments with reference to the accompanying drawings. The embodiments are not intended to limit the scope of the present disclosure but exemplify the present disclosure. Not all of the features and the combinations thereof described in the embodiments are necessarily essential to the present disclosure. Identical or like constituting elements, members, processes shown in the drawings are represented by identical symbols and a duplicate description will be omitted as appropriate.

The scales and shapes shown in the figures are defined for convenience's sake to make the explanation easy and shall not be interpreted limitatively unless otherwise specified. Terms like "first", "second", etc. used in the specification and claims do not indicate an order or importance by any means unless specified otherwise and are used to distinguish a certain feature from the others. Those of the members that are not important in describing the embodiment are omitted from the drawings.

FIG. 1 is a schematic diagram of a laminated electrode assembly manufacturing device 1 according to an embodiment. A laminated electrode assembly manufacturing device is a continuous drum-type manufacturing device in which multiple drums are combined. Performing each process of cutting, heating, bonding, laminating, and the like of electrode bodies and separators on the drums enables high-speed and continuous manufacturing of laminated electrode assemblies. The laminated electrode assemblies may be used, for example, for lithium-ion secondary batteries. The structure of the laminated electrode assembly manufacturing device 1 is not limited to a continuous drum-type.

The laminated electrode assembly manufacturing device 1 includes a first electrode cutting drum 2, a first electrode heating drum 4, a second electrode cutting drum 6, a second electrode heating drum 8, a bonding drum 10, a separator cutting drum 12, and a laminating drum 14.

The first electrode cutting drum 2 is a drum for cutting a continuous body of multiple first electrode plates into multiple individual first electrode plates and conveying the plates. In the present embodiment, the first electrode is a negative electrode. To the first electrode cutting drum 2, a strip-shaped first electrode continuous body N as the continuous body of multiple first electrode plates is supplied. The first electrode continuous body N includes a first electrode current collector and a first electrode active material layer. The first electrode active material layer is laminated on the first electrode current collector. In the present embodiment, the first electrode active material layer is laminated on both sides of the first electrode current collector, but the first electrode active material layer may be laminated on only one side of the first electrode current collector.

Each of the first electrode current collector and the first electrode active material layer can be made of a publicly-known material and has a publicly-known structure. The first electrode current collector may be, for example, constituted by foil or a porous body made of copper, aluminum, or the like. The first electrode active material layer may be formed by applying, onto a surface of the first electrode current collector, first electrode mixture slurry containing a first electrode active material, a binder, a dispersant, and the like and by drying and rolling the applied film. The thickness of the first electrode current collector may be in the range from 3 µm to 50 µm inclusive, for example. Also, the thickness of the first electrode active material layer may be in the range from 10 µm to 100 µm inclusive, for example.

The first electrode cutting drum 2 includes multiple holding heads arranged in a circumferential direction of the drum, and a cutting blade that cuts the first electrode continuous body N. Each of the multiple holding heads includes a holding surface that adsorbs and holds the first electrode continuous body N. The holding surface of each holding head faces outward from the first electrode cutting drum 2. The first electrode continuous body N supplied to the first electrode cutting drum 2 is conveyed by the rotation of the first electrode cutting drum 2 while being adsorbed and held by the holding surfaces of the multiple holding heads.

Each of the multiple holding heads rotates around the central axis of the first electrode cutting drum 2 and can also move in a circumferential direction of the drum independently of other holding heads. Relative movement of each holding head is achieved by mounting thereon a motor that is different from the motor used to rotate the first electrode cutting drum 2. Independent driving of the holding heads enables adjustment of the positions of cutting by the cutting blade in the first electrode continuous body N and also enables adjustment of the positions of the individually divided first electrode plates, for example.

The first electrode cutting drum 2 adsorbs and holds the supplied first electrode continuous body N and rotates to convey the first electrode continuous body N. At a cutting position 16 schematically illustrated in FIG. 1, the first electrode cutting drum 2 cuts the first electrode continuous body N. The first electrode continuous body N is cut by the cutting blade at a position between adjacent holding heads, so that multiple individual first electrode plates are obtained. Each first electrode plate thus obtained is conveyed while being adsorbed and held by each holding head. The positions of the multiple produced first electrode plates are monitored by a camera, etc.

The first electrode heating drum 4 is disposed in close proximity to the first electrode cutting drum 2. Before the proximity position between the first electrode cutting drum 2 and the first electrode heating drum 4, the speed of a holding head of the first electrode cutting drum 2 is temporarily increased or decreased until it becomes substantially identical with the linear velocity of the first electrode heating drum 4. As a result, the relative speed of the holding head with respect to the first electrode heating drum 4 becomes substantially zero. At the timing when the relative speed becomes substantially zero, the holding head discharges, to the first electrode heating drum 4 side, the first electrode plate that the holding head has adsorbed and held.

The first electrode heating drum 4 rotates while adsorbing and holding the first electrode plates discharged from the first electrode cutting drum 2 and preheats the first electrode plates with a built-in heater. The preheating is performed to thermally bond a first electrode plate and a separator in the subsequent bonding process. Although the first electrode plates are heated at a heating position 18 in the present embodiment, the position is not limited thereto. For example, the first electrode plates may be heated in the entire circumferential area of the first electrode heating drum 4.

The second electrode cutting drum 6 is a drum for cutting a continuous body of multiple second electrode plates into multiple individual second electrode plates and conveys the plates. In the present embodiment, the second electrode is a positive electrode. To the second electrode cutting drum 6, a strip-shaped second electrode continuous body P as the continuous body of multiple second electrode plates is supplied. The second electrode continuous body P includes a second electrode current collector and a second electrode active material layer. The second electrode active material layer is laminated on the second electrode current collector. In the present embodiment, the second electrode active material layer is laminated on both sides of the second electrode current collector, but the second electrode active material layer may be laminated on only one side of the second electrode current collector.

Each of the second electrode current collector and the second electrode active material layer can be made of a publicly-known material and has a publicly-known structure. The second electrode current collector may be, for example, constituted by foil or a porous body made of stainless steel, aluminum, or the like. The second electrode active material layer may be formed by applying, onto a surface of the second electrode current collector, second electrode mixture slurry containing a second electrode active material, a binder, a dispersant, and the like and by drying and rolling the applied film. The thickness of the second electrode current collector may be in the range from 3 µm to 50 µm inclusive, for example. Also, the thickness of the second electrode active material layer may be in the range from 10 µm to 100 µm inclusive, for example.

The second electrode cutting drum 6 includes multiple holding heads arranged in a circumferential direction of the drum, and a cutting blade that cuts the second electrode continuous body P. Each of the multiple holding heads includes a holding surface that adsorbs and holds the second electrode continuous body P. The holding surface of each holding head faces outward from the second electrode cutting drum 6. The second electrode continuous body P supplied to the second electrode cutting drum 6 is conveyed by the rotation of the second electrode cutting drum 6 while being adsorbed and held by the holding surfaces of the multiple holding heads.

Each of the multiple holding heads rotates around the central axis of the second electrode cutting drum 6 and can also move in a circumferential direction of the drum independently of other holding heads. Relative movement of each holding head is achieved by mounting thereon a motor that is different from the motor used to rotate the second electrode cutting drum 6. Independent driving of the holding heads enables adjustment of the positions of cutting by the cutting blade in the second electrode continuous body P and also enables adjustment of the positions of the individually divided second electrode plates, for example.

The second electrode cutting drum 6 adsorbs and holds the supplied second electrode continuous body P and rotates to convey the second electrode continuous body P. At a cutting position 20 schematically illustrated in FIG. 1, the second electrode cutting drum 6 cuts the second electrode continuous body P. The second electrode continuous body P is cut by the cutting blade at a position between adjacent holding heads, so that multiple individual second electrode plates are obtained. Each second electrode plate thus obtained is conveyed while being adsorbed and held by each holding head. The positions of the multiple produced second electrode plates are monitored by a camera, etc.

The second electrode heating drum 8 is disposed in close proximity to the second electrode cutting drum 6. Before the proximity position between the second electrode cutting drum 6 and the second electrode heating drum 8, the speed of a holding head of the second electrode cutting drum 6 is temporarily increased or decreased until it becomes substantially identical with the linear velocity of the second electrode heating drum 8. As a result, the relative speed of the holding head with respect to the second electrode heating drum 8 becomes substantially zero. At the timing when the relative speed becomes substantially zero, the holding head discharges, to the second electrode heating drum 8 side, the second electrode plate that the holding head has adsorbed and held.

The second electrode heating drum 8 rotates while adsorbing and holding the second electrode plates discharged from the second electrode cutting drum 6 and preheats the second electrode plates with a built-in heater. The preheating is performed to thermally bond a second electrode plate and a separator in the subsequent bonding process. Although the second electrode plates are heated at a heating position 22 in the present embodiment, the position is not limited thereto. For example, the second electrode plates may be heated in the entire circumferential area of the second electrode heating drum 8.

The bonding drum 10 is a drum that forms a continuous laminated body 26 in which multiple unit laminated bodies are continuously arranged. Each unit laminated body is constituted by a first separator, a first electrode plate, a second separator, and a second electrode plate. The bonding drum 10 is disposed in close proximity to the first electrode heating drum 4 and the second electrode heating drum 8. To the bonding drum 10, a strip-shaped first separator continuous body S1, in which multiple first separators are continuously arranged, and a strip-shaped second separator continuous body S2, in which multiple second separators are continuously arranged, are supplied. On a surface of each of the first separator continuous body S1 and the second separator continuous body S2, a thermal bonding layer is provided. The thermal bonding layer has a property of developing no adhesiveness at room temperature but developing adhesiveness when heated. The thermal bonding layer may be, for example, a thermoplastic layer containing a thermoplastic polymer, which develops adhesiveness based on plastic deformation of the thermoplastic polymer caused by heating.

Also, to the bonding drum 10, multiple first electrode plates are supplied from the first electrode cutting drum 2 via the first electrode heating drum 4, and multiple second electrode plates are supplied from the second electrode cutting drum 6 via the second electrode heating drum 8. A first electrode plate is rotationally conveyed while being preheated on the first electrode heating drum 4 and is discharged, to the bonding drum 10 side, at the proximity position between the first electrode heating drum 4 and the bonding drum 10. A second electrode plate is rotationally conveyed while being preheated on the second electrode heating drum 8 and is discharged, to the bonding drum 10 side, at the proximity position between the second electrode heating drum 8 and the bonding drum 10.

The first separator continuous body S1, each first electrode plate, the second separator continuous body S2, and each second electrode plate are supplied to the bonding drum 10 at positions provided in the enumerated order from the upstream side of the rotational direction of the bonding drum 10. Accordingly, the first separator continuous body S1 is supplied to the bonding drum 10 first at a certain position. The first separator continuous body S1 is adsorbed and held by the bonding drum 10 and rotationally conveyed. Subsequently, at a position on the downstream side of the supply position of the first separator continuous body S1, the first electrode plates are supplied from the first electrode heating drum 4 to the bonding drum 10 and placed on the first separator continuous body S1. The multiple first electrode plates are arranged on the first separator continuous body S1 at predetermined intervals in the conveying direction of the first separator continuous body S1.

Subsequently, at a position on the downstream side of the supply position of the first electrode plates, the second separator continuous body S2 is supplied to the bonding drum 10 and placed over the multiple first electrode plates. Thereafter, the first separator continuous body S1, multiple first electrode plates, and second separator continuous body S2 are pressurized by a thermocompression bonding roller 24, at a position on the downstream side of the supply position of the second separator continuous body S2. Accordingly, the first separator continuous body S1, each first electrode plate, and the second separator continuous body S2 are bonded together. Subsequently, at a position on the downstream side of the position of pressure bonding by the thermocompression bonding roller 24, the second electrode plates are supplied from the second electrode heating drum 8 to the bonding drum 10 and placed on the second separator continuous body S2. The multiple second electrode plates are arranged on the second separator continuous body S2 at predetermined intervals in the conveying direction of the second separator continuous body S2. Also, the multiple second electrode plates are bonded to the second separator continuous body S2 by the pressing force of the second electrode heating drum 8.

Through the process described above, the first separator continuous body S1, multiple first electrode plates, second separator continuous body S2, and multiple second electrode plates are laminated in this order and bonded to each other, forming a continuous laminated body 26. The continuous laminated body 26 has a structure in which the unit laminated bodies, which each are constituted by a first separator, a first electrode plate, a second separator, and a second electrode plate, are continuously connected by the first separator continuous body S1 and the second separator continuous body S2. The continuous laminated body 26 is conveyed from the bonding drum 10 to the separator cutting drum 12. By halting the supply of the second electrode plates from the second electrode cutting drum 6 side, three-layered unit laminated bodies without the second electrode plates may be produced after every fixed number of pieces. The electrode plates of which supply is halted may also be the first electrode plates.

The separator cutting drum 12 is a drum that cuts the first separator continuous body S1 and the second separator continuous body S2 in the continuous laminated body 26 to obtain multiple individual unit laminated bodies. The separator cutting drum 12 includes multiple holding heads arranged in a circumferential direction of the drum, and a cutting blade that cuts the continuous laminated body 26. Each of the multiple holding heads includes a holding surface that adsorbs and holds the continuous laminated body 26. The holding surface of each holding head faces outward from the separator cutting drum 12. The continuous laminated body 26 supplied to the separator cutting drum 12 is conveyed by the rotation of the separator cutting drum 12 while being adsorbed and held by the holding surfaces of the multiple holding heads.

Each of the multiple holding heads rotates around the central axis of the separator cutting drum 12 and may also be capable of moving in a circumferential direction of the drum independently of other holding heads. Relative movement of each holding head is achieved by mounting thereon a motor that is different from the motor used to rotate the separator cutting drum 12. Independent driving of the holding heads enables adjustment of the positions of cutting by the cutting blade in the continuous laminated body 26 and also enables adjustment of the positions of the individually divided unit laminated bodies, for example.

The separator cutting drum 12 adsorbs and holds the supplied continuous laminated body 26 and rotates to convey the continuous laminated body 26. At a cutting position 28 schematically illustrated in FIG. 1, the separator cutting drum 12 cuts the continuous laminated body 26. The continuous laminated body 26 is cut by the cutting blade at a position between adjacent holding heads, so that multiple individual unit laminated bodies are obtained. At the time, in the continuous laminated body 26, the first separator continuous body S1 and the second separator continuous body S2 are cut at a position between electrode plates that are adjacent in the conveying direction of the continuous laminated body 26. Each unit laminated body thus obtained is conveyed while being adsorbed and held by each holding head. A holding head discharges, to the laminating drum 14 side, a unit laminated body that the holding head has adsorbed and held. The positions of the multiple produced unit laminated bodies are monitored by a camera, etc.

The laminating drum 14 laminates multiple unit laminated bodies on a lamination stage 30 to form a laminated electrode assembly. The laminating drum 14 includes multiple laminating heads arranged in a circumferential direction of the drum. Each laminating head includes a holding surface that adsorbs and holds a unit laminated body. The holding surface of each laminating head faces outward from the laminating drum 14. Each of the multiple laminating heads rotates around the central axis of the laminating drum 14 and to advance sequentially to a laminating position facing the lamination stage 30. The laminating head reaching the laminating position discharges, onto the lamination stage 30, a unit laminated body that the laminating head has been holding.

The lamination stage 30 is disposed immediately beneath the laminating drum 14. On the lamination stage 30, the unit laminated bodies discharged from the respective laminating heads of the laminating drum 14 are sequentially laminated. Thus, a laminated electrode assembly is formed. The lamination stage 30 can be driven in an X-axis direction and a Y-axis direction perpendicular to each other. Also, a tilt angle on an X-Y plane of the lamination stage 30 can be adjusted. This enables adjustment of the positions in the X-axis direction and the Y-axis direction and the tilt angle of a unit laminated body discharged from the laminating drum 14, with respect to a unit laminated body already laminated on the lamination stage 30.

Figure 2:
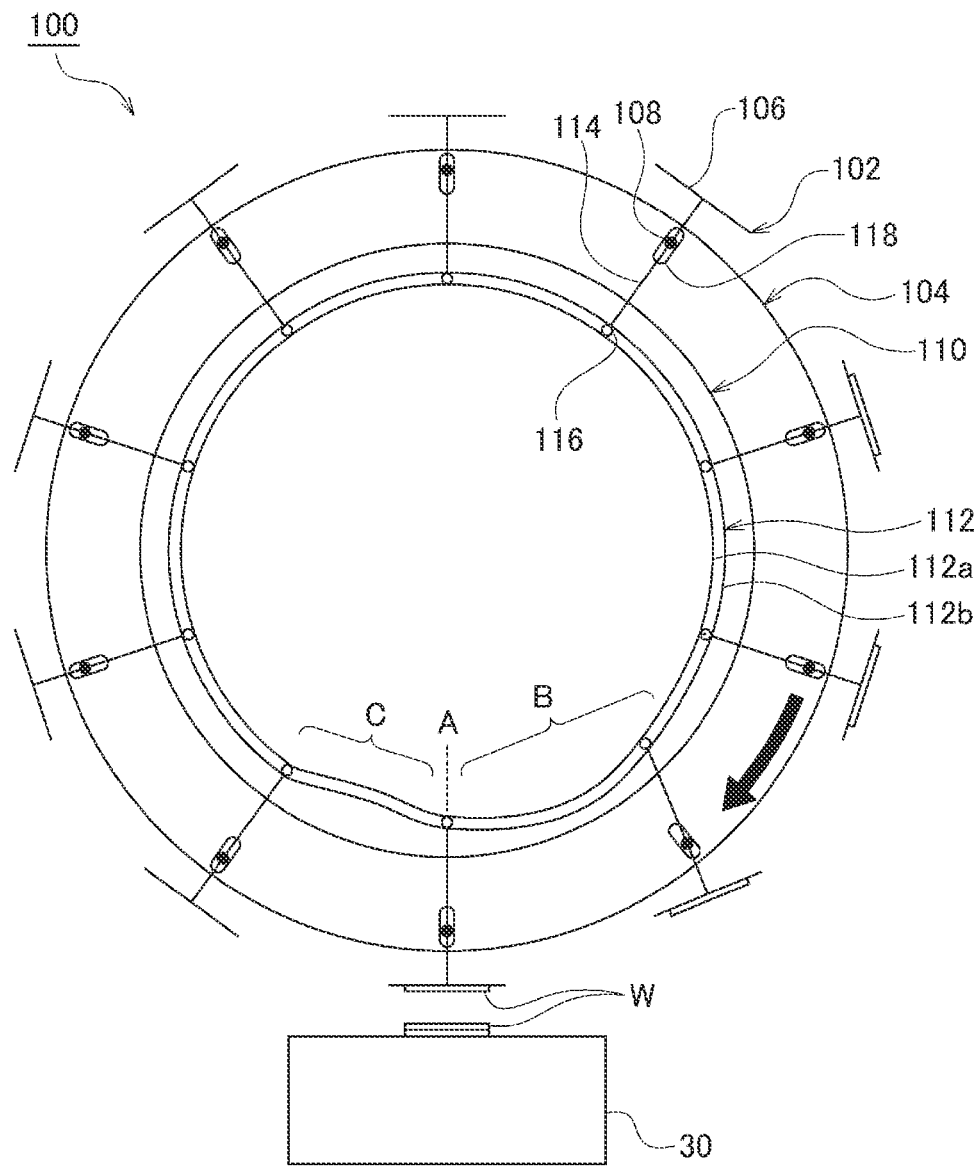
FIG. 2 is a front view that schematically illustrates a laminating device according to the embodiment.

The laminating drum 14 is constituted by a laminating device 100 according to the present embodiment. FIG. 2 is a front view that schematically illustrates the laminating device 100 according to the embodiment. In FIG. 2, illustration of a biasing member 120, a first attraction section 122, a second attraction section 124, a first repulsion section 126, a second repulsion section 128, a third attraction section 130, and a fourth attraction section 132 described later is omitted.

The laminating device 100 is a device that discharges a unit laminated body W in which a separator and an electrode plate are laminated onto the lamination stage 30 and that laminates multiple unit laminated bodies W. The laminating device 100 includes multiple laminating heads 102 and a drum section 104. Each laminating head 102 has a holding surface 106 that holds the unit laminated body W. For example, the holding surface 106 has a suction mechanism for sucking an atmosphere gas such as air and can adsorb and hold the unit laminated body W.

The drum section 104 is discoid, and multiple laminating heads 102 are arranged on the circumference at substantially equal intervals. Although 10 laminating heads 102 are arranged on the drum section 104 shown in FIG. 2, the number of laminating heads 102 arranged is not limited to 10. The holding surface 106 of each laminating head 102 arranged on the drum section 104 faces outward in a radial direction of the drum section 104. A driving mechanism (not shown) such as a motor is coupled to the central axis so that the drum section 104 can rotate around the central axis. Each laminating head 102 rotates in association with the rotation of the drum section 104 to advance sequentially to a laminating position A facing the lamination stage 30.

In discharging the unit laminated body W onto the lamination stage 30 from the laminating head 102 reaching the laminating position A, it is desired to halt each laminating head 12 at the laminating position A in order to discharge the unit laminated body W onto the lamination stage 30 with high positional accuracy. One conceivable method to realize this is to halt the rotation of the drum section 104 every time each laminating head 102 reaches the laminating position A. When the rotation of the drum section 104 is repeatedly halted, however, the throughput of the laminating device is lowered, and the lead time of battery production is extended.

This is addressed in the laminating device 100 of this embodiment by realizing instantaneous halt of the laminating head 102 at the laminating position A by means of a cam mechanism. In other words, the drum section 104 swingably holds each laminating head 102 via a support shaft 108. Further, the laminating device 100 includes a cam section 110. The cam section 110 is in contact with each laminating head 102 and causes each laminating head 102 to swing around the support shaft 108 in association with the movement of each laminating head 102 caused by the rotation of the drum section 104. In other words, the cam section 110 is the driver, and each laminating head 102 is the follower.

The cam section 110 does not follow the rotation of the drum section 104. In other words, the attitude of the cam section 110 is fixed, and the cam section 110 does not rotate even when the drum section 104 rotates. Therefore, the drum section 104 is displaced relative to the cam section 110. Further, the cam section 110 has a cam groove 112 that extends in the circumferential direction of the drum section 104. Therefore, the cam section 110 is a face cam. The structure of the cam section 110 is not limited to this. The cam groove 112 has a shape concentric with the drum section 104 and comprised of a base circle having a radius smaller than that of the drum section 104. However, the cam groove 112 is curved beyond the base circle in a direction away from the center of circle in an approach zone B passed by the laminating head 102 as it approaches the laminating position A. Further, the cam groove 112 is curved beyond the base circle in a direction toward the center of the circle in an exit zone C passed by the laminating head 102 as it leaves the laminating position A. The cam groove 112 has an inner side surface 112a and an outer side surface 112b that face each other. The inner side surface 112a is positioned more inward than the outer side surface 112b in a radial direction of the drum section 104, and the outer side surface 112b is positioned more outward than the inner side surface 112a in the radial direction of the drum section 104.

Each laminating head 102 has an arm section 114 elongated in a radial direction of the drum section 104. The holding surface 106 is provided at an end of the arm section 114 positioned outward in a radial direction of the drum section 104. Further, a projecting section 116 is provided at an end positioned inward in the radial direction. The projecting section 116 is engaged with the cam groove 112. The projecting section 116 is slidably sandwiched by the inner side surface 112a and the outer side surface 112b when engaged with the cam groove 112. The support shaft 108 is provided between the holding surface 106 and the projecting section 116 in the arm section 114.

The drum section 104 has an elongated hole 118 at a position aligned with the support shaft 108. The support shaft 108 is swingably held by the drum section 104 by being inserted into the elongated hole 118. Each elongated hole 118 is elongated in a radial direction of the drum section 104. This permits displacement of the support shaft 108 in the radial direction of the drum section 104 when each laminating head 102 swings.

The combination of the shape of the cam groove 112 with the holding structure (including the shape of the elongated hole 118) of the drum section 104 for holding the laminating head 102 makes it possible to halt each laminating head 102 at the laminating position A while also maintaining the rotation of the drum section 104 at a constant angular speed. This makes it possible to produce high-quality laminated electrode assemblies by laminating unit laminated bodies W with high positional accuracy and to suppress extension of the lead time of battery production. It also make it easy to address an increase in the number of laminating heads 102, an increase in the rotational speed of the drum section 104, etc.

Figure 3:
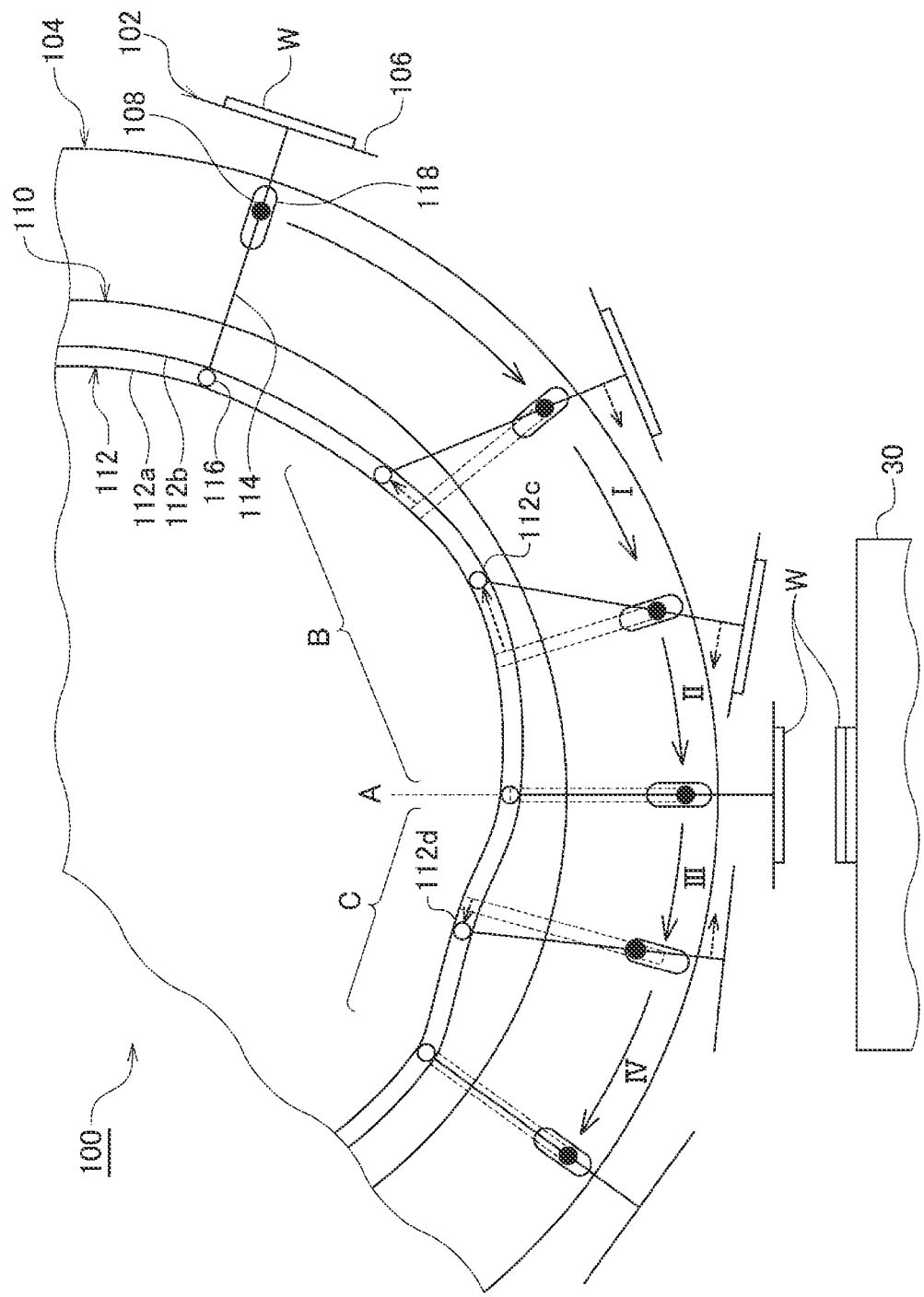
FIG. 3 schematically shows transition of the position and the attitude of the laminating head.

FIG. 3 schematically shows transition of the position and the attitude of the laminating head 102. In FIG. 3, illustration of the biasing member 120, the first attraction section 122, the second attraction section 124, the first repulsion section 126, the second repulsion section 128, the third attraction section 130, and the fourth attraction section 132 described later is omitted. In FIG. 3, the attitude (hereinafter, reference attitude) that the laminating head 102 would assume when the cam section 110 is not provided is also shown in part by broken lines.

As shown in FIG. 3, each laminating head 102 swings around the support shaft 108 as the projecting section 116 moves along the cam groove 112 according to the rotation of the drum section 104. In other words, the movement of the projecting section 116 will be slower or faster relative to the movement of the support shaft 108 because the path of the cam groove 112 is displaced in the radial direction of the drum section 104 in the approach zone B and in the exit zone C. Therefore, the positions of the projecting section 116 and the support shaft 108 are displaced in the circumferential direction of the drum section 104. When the positions of the projecting section 116 and the support shaft 108 are displaced in the circumferential direction of the drum section 104, the laminating head 102 swings, with the support shaft 108 being the supporting point.

Hereinafter, the position of each part in the circumferential direction of the drum section 104 will be referred to as a circumferential position. The state in which the circumferential positions of the projecting section 116 and the support shaft 108 are aligned is the state in which the straight line passing through the center of the drum section 104 and the projecting section 116 is aligned with the straight line passing through the center of the drum section 104 and the support shaft 108. Meanwhile, the state in which the circumferential positions of the projecting section 116 and the support shaft 108 are displaced is the state in which the two straight lines are not aligned. When the laminating head 102 assumes the reference attitude, the circumferential positions of the projecting section 116 and the support shaft 108 are aligned.

The projecting section 116 entering the approach zone B of the cam groove 112 is progressively delayed with respect to the movement of the support shaft 108 until the projecting section 116 reaches an apex 112c of the convex part of the approach zone B (movement indicated by the arrow I in FIG. 3) In other words, the circumferential position of the projecting section 116 is displaced from the circumferential position of the support shaft 108 in a direction opposite to the direction of advancement of the laminating head 102. Therefore, the holding surface 106 is displaced in the direction of advancement of the laminating head 102.

Subsequently, the circumferential position of the projecting section 116 progressively approaches the circumferential position of the support shaft 108 while the projecting section 116 moves from the apex 112c of the convex part to the laminating position A (movement indicated by the arrow II in FIG. 3). At the laminating position A, the circumferential positions of the projecting section 116 and the support shaft 108 are aligned. Therefore, the laminating head 102 assumes the reference attitude. In the process in which the circumferential position of the projecting section 116 approaches the circumferential position of the support shaft 108, the holding surface 106 is displaced in a direction opposite to the direction of advancement of the laminating head 102. The displacement in the opposite direction can cancel a part of the amount of movement of the holding surface 106 caused by the rotation of the drum section 104 and decelerate the holding surface 106.

When the laminating head 102 is halted by the cam mechanism at the laminating position A, the holding surface 106 could vibrate due to the inertia. As described above, the holding surface 106 could similarly vibrate when the laminating head 102 is halted by halting the drum section 104. When the holding surface 106 vibrates, misalignment occurs in the unit laminated body W and the quality of the laminated electrode assembly is lowered. Further, when the laminating head 102 is halted at the laminating position A until the vibration of the holding surface 106 diminishes, the productivity of the laminated electrode assembly is lowered. Meanwhile, the vibration of the holding surface 106 occurring when the laminating head 102 is halted can be reduced by reducing the speed of movement of the holding surface 106 reaching the laminating position A. This can simultaneously meet the requirements for quality and productivity of laminated electrode assemblies.

The projecting section 116 entering the exit zone C from the approach zone A progressively leads the movement of the support shaft 108 until the projecting section 116 reaches a bottom point 112d of the concave part of the exit zone C (movement indicated by the arrow III in FIG. 3). In other words, the circumferential position of the projecting section 116 is displaced from the circumferential position of the support shaft 108 in the direction of advancement of the laminating head 102. For this reason, the holding surface 106 is displaced in a direction opposite to the direction of advancement of the laminating head 102.

Subsequently, when the projecting section 116 passes the bottom point 112d of the concave part (movement indicated by the arrow IV in FIG. 3), the circumferential position of the projecting section 116 progressively approaches the circumferential position of the support shaft 108. At the terminal end of the exit zone C, the circumferential positions of the projecting section 116 and the support shaft 108 are aligned. In the process in which the circumferential position of the projecting section 116 approaches the circumferential position of the support shaft 108, the holding surface 106 is displaced in the direction of advancement of the laminating head 102. The displacement in the forward direction can accelerate the holding surface 106. The path of the cam groove 112 is not limited to the path shown in FIG. 3.

Figure 4:
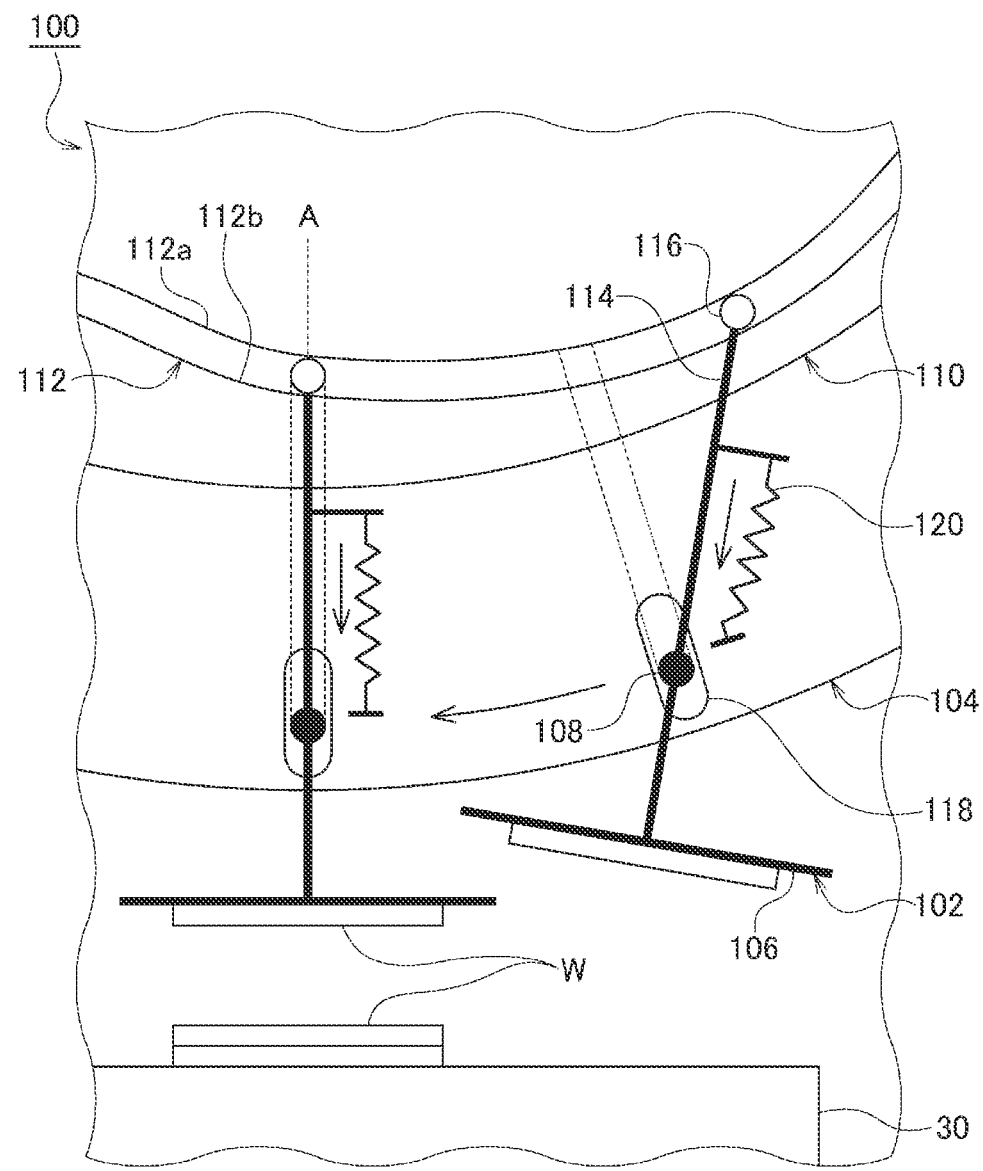
FIG. 4 is a diagram schematically showing a vibration suppression mechanism for suppressing the vibration of the holding surface by using the biasing member.

FIG. 4 is a diagram schematically showing a vibration suppression mechanism for suppressing the vibration of the holding surface 106 by using the biasing member 120. When the cam mechanism causes the laminating head 102 to swing, the dimension tolerance of the members including the support shaft 108, the projecting section 116, the elongated hole 118, and the cam groove 112 accumulate so that the holding surface 106 vibrates easily. This is addressed in the laminating device 100 by providing the biasing member 120 that biases each laminating head 102 in a radial direction of the drum section 104. For example, a publicly known elastic member can be used as the biasing member 120. The elastic member is exemplified by a spring such as a coil spring.

As the laminating head 102 is biased by the biasing member 120 in the radial direction of the drum section 104, shakiness of the holding surface 106 caused by the dimension tolerance of the parts can be suppressed. Therefore, the vibration of the holding surface 106 can be suppressed. Further, the biasing member 120 presses the projecting section 116 against the side surface of the cam groove 112 in this embodiment. This stabilizes the attitude of the projecting section 116 and, ultimately, the entirety of the laminating head 102. Accordingly, the vibration of the holding surface 106 can be suppressed more successfully.

One end of the biasing member 120 is coupled to an arbitrary position of the laminating head 102. The other end of the biasing member 120 is coupled to an arbitrary position of the drum section 104. In this embodiment, one end of the biasing member 120 is coupled to the arm section 114 by way of one example, and the other end of the biasing member 120 is coupled to the disc surface of the drum section 104. The position of the biasing member 120 of this embodiment coupled to the laminating head 102 is more inward in the radial direction of the drum section 104 than the position coupled to the drum section 104. Therefore, the laminating head 102 is biased radially outward with respect to the drum section 104. Accordingly, the biasing member 120 presses the projecting section 116 against the outer side surface 112b.

The position of the biasing member 120 coupled to the laminating head 102 may be radially more outward than the position coupled to the drum section 104 to press the projecting section 116 against the inner side surface 112a. The other end of the biasing member 120 may be coupled to the cam section 110 or coupled to both the drum section 104 and the cam section 110.

Figure 5:
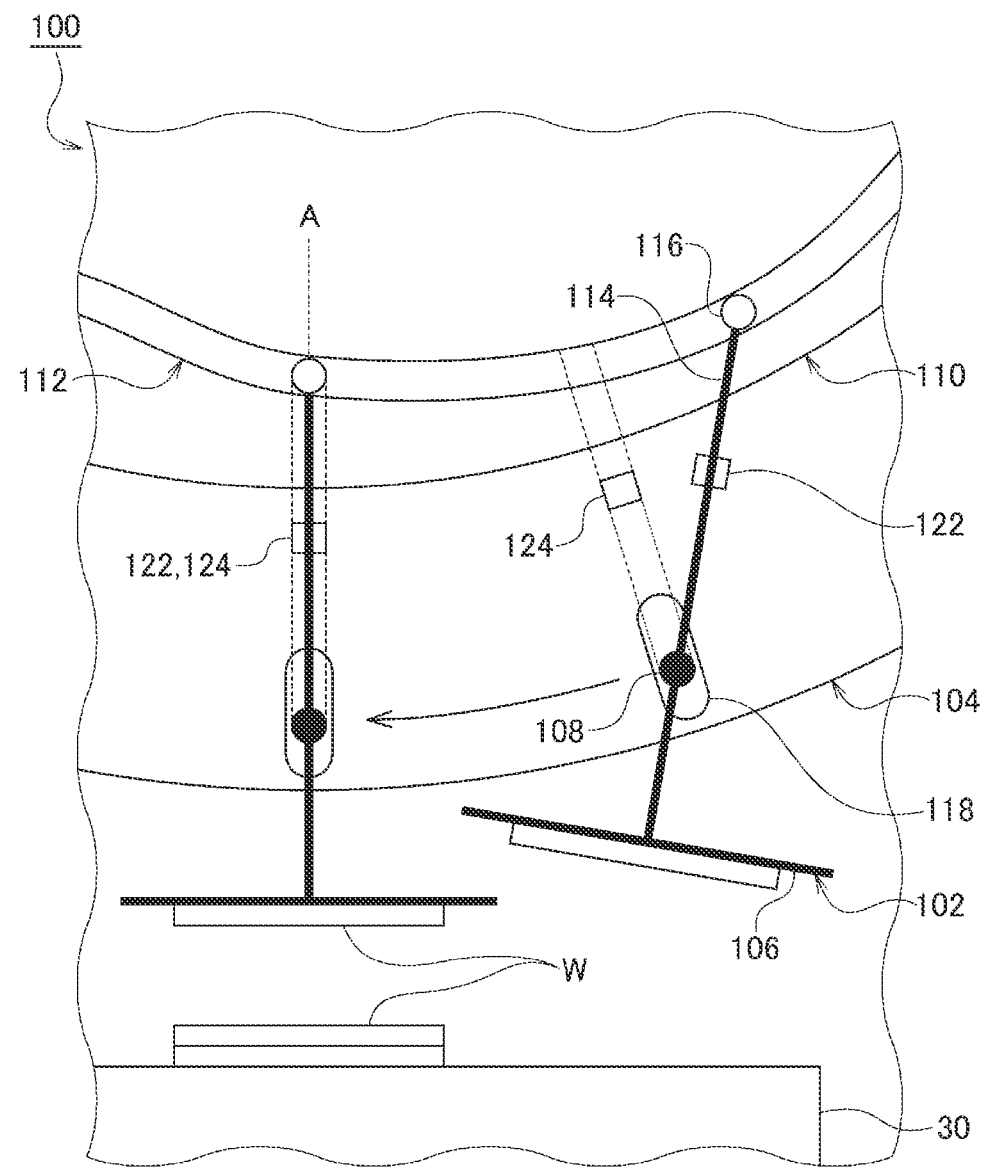
FIG. 5 is a diagram schematically showing a vibration suppression mechanism for suppressing the vibration of the holding surface by using the first attraction section and the second attraction section.

FIG. 5 is a diagram schematically showing a vibration suppression mechanism for suppressing the vibration of the holding surface 106 by using the first attraction section 122 and the second attraction section 124. As described above, the vibration of the holding surface 106 occurring when the laminating head 102 is halted can be suppressed by decelerating the holding surface 106 approaching the laminating position A. Meanwhile, there is a requirement to increase the rotational speed of the drum section 104 in order to improve the throughput of the laminating device 100. When the rotational speed of the drum section 104 is increased, a larger force is exerted on the laminating head 102 halted at the laminating position A. This causes the holding surface 106 to vibrate more easily.

This is addressed in the laminating device 100 of this embodiment by providing the first attraction section 122 and the second attraction section 124 that attract each other. The first attraction section 122 is provided in each laminating head 102. The first attraction section 122 is fixed to the arm section 114 by way of one example. The second attraction section 124 is provided at a position in the drum section 104 aligned with (facing), when each laminating head 102 is at the laminating position A, the first attraction section 122 provided in the laminating head 102. Multiple second attraction sections 124 are provided in the drum section 104, and each second attraction section 124 is fixed at a position corresponding to the associated laminating head 102. Therefore, each first attraction section 122 and the associated second attraction section 124 are aligned when each laminating head 102 assumes the reference attitude. The "position . . . aligned" mentioned above is a position at which alignment occurs in the direction of central axis of the drum section 104 (direction normal to the disc).

For example, the first attraction section 122 and the second attraction section 124 are magnets (permanent magnets) or electromagnets. Further, the first attraction section 122 and the second attraction section 124 have opposite polarities. The first attraction section 122 and the second attraction section 124 aligned at the laminating position A attract each other by magnetic attraction. This stabilizes the attitude of the laminating head 102 when the laminating head 102 is halted. Accordingly, the vibration of the holding surface 106 can be suppressed more successfully.

When the second attraction section 124 is a magnet or an electromagnet, the first attraction section 122 may be a ferromagnetic body. In this case, the laminating head 102 can itself function as the first attraction section 122. Similarly, the second attraction section 124 may be a ferromagnetic body when the first attraction section 122 is a magnet or an electromagnet. In this case, the drum section 104 can itself function as the second attraction section 124.

The cam mechanism allows the laminating head 102 to swing against the attractive force of the first attraction section 122 and the second attraction section 124. Even when an attractive force is produced between the first attraction section 122 and the second attraction section 124, therefore, the laminating head 102 can assume any attitude determined by the cam mechanism. When the first attraction section 122 is constituted by an electromagnet, a magnetic force may be produced only in the first attraction section 122 of the laminating head 102 at the laminating position A. Similarly, a magnetic force may be produced only in the second attraction section 124 at the laminating position A when the second attraction section 124 is constituted by an electromagnet. This allows each laminating head 102 to move more smoothly.

Figure 6:
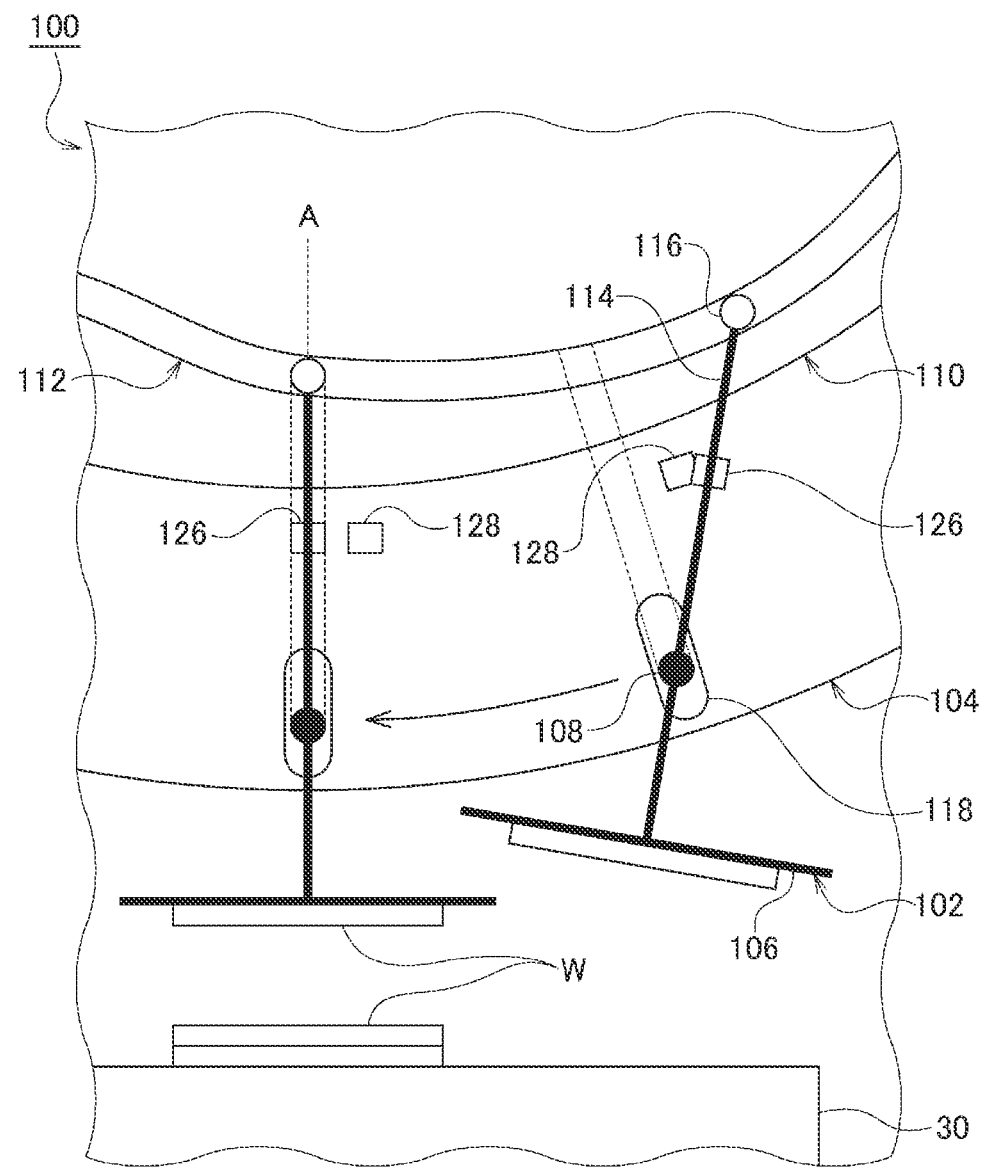
FIG. 6 is a diagram schematically showing a vibration suppression mechanism for suppressing the vibration of the holding surface by using the first repulsion section and the second repulsion section.

FIG. 6 is a diagram schematically showing a vibration suppression mechanism for suppressing the vibration of the holding surface 106 by using the first repulsion section 126 and the second repulsion section 128. The mechanism for suppressing the vibration of the holding surface 106 may utilize repulsion of the first repulsion section 126 and the second repulsion section 128 in place of or in addition to utilizing adsorption of the first attraction section 122 and the second attraction section 124.

In other words, the laminating device 100 of this embodiment includes the first repulsion section 126 and the second repulsion section 128 that are repulsive to each other. The first repulsion section 126 is provided in each laminating head 102. The first repulsion section 126 is fixed to the arm section 114 by way of one example. The second repulsion section 128 is provided at a position in the drum section 104 displaced, when each laminating head 102 is at the laminating position A, from the first repulsion section 126 provided in the laminating head 102. Multiple second repulsion sections 128 are provided in the drum section 104, and each second repulsion section 128 is fixed at a position corresponding to each laminating head 102. The "position . . . displaced" is a position where alignment does not occur in the direction of central axis of the drum section 104. Preferably, the circumferential positions of the first repulsion section 126 and the second repulsion section 128 are displaced. Further, the positions of the first repulsion section 126 and the second repulsion section 128 corresponding to each other are defined such that a repulsive force is produced therebetween when each laminating head 102 is at the laminating position A.

For example, the first repulsion section 126 and the second repulsion section 128 are magnets of electromagnets. Further, the first repulsion section 126 and the second repulsion section 128 have the same polarity. The first repulsion section 126 provided in the laminating head 102 at the laminating position A and the second repulsion section 128 corresponding to this first repulsion section 126 are repulsive to each other due to the magnetic repulsive force. Meanwhile, the movable range of the laminating head 102 is restricted by the cam mechanism. Therefore, the laminating head 102 is pressed against the boundary of the movable range due to mutual repulsion between the first repulsion section 126 and the second repulsion section 128. This stabilizes the attitude of the laminating head 102 when the laminating head 102 is halted. Accordingly, the vibration of the holding surface 106 can be suppressed more successfully.

When the second attraction section 124 is a magnet or an electromagnet, the first attraction section 122 may be a diamagnetic body. Similarly, the second attraction section 124 may be a diamagnetic body when the first attraction section 122 is magnet or an electromagnet.

The cam mechanism allows the laminating head 102 to swing against the repulsive force of the first repulsion section 126 and the second repulsion section 128. Even when a repulsive force is produced between the first repulsion section 126 and the second repulsion section 128, therefore, the laminating head 102 can assume any attitude determined by the cam mechanism. When the first repulsion section 126 is constituted by an electromagnet, a magnetic force may be produced only in the first repulsion section 126 of the laminating head 102 at the laminating position A. Similarly, when the second repulsion section 128 is constituted by an electromagnet, a magnetic force may be produced only in the second repulsion section 128 for which the corresponding first repulsion section 126 is at the laminating position A. This allows each laminating head 102 to move more smoothly.

Figure 7:
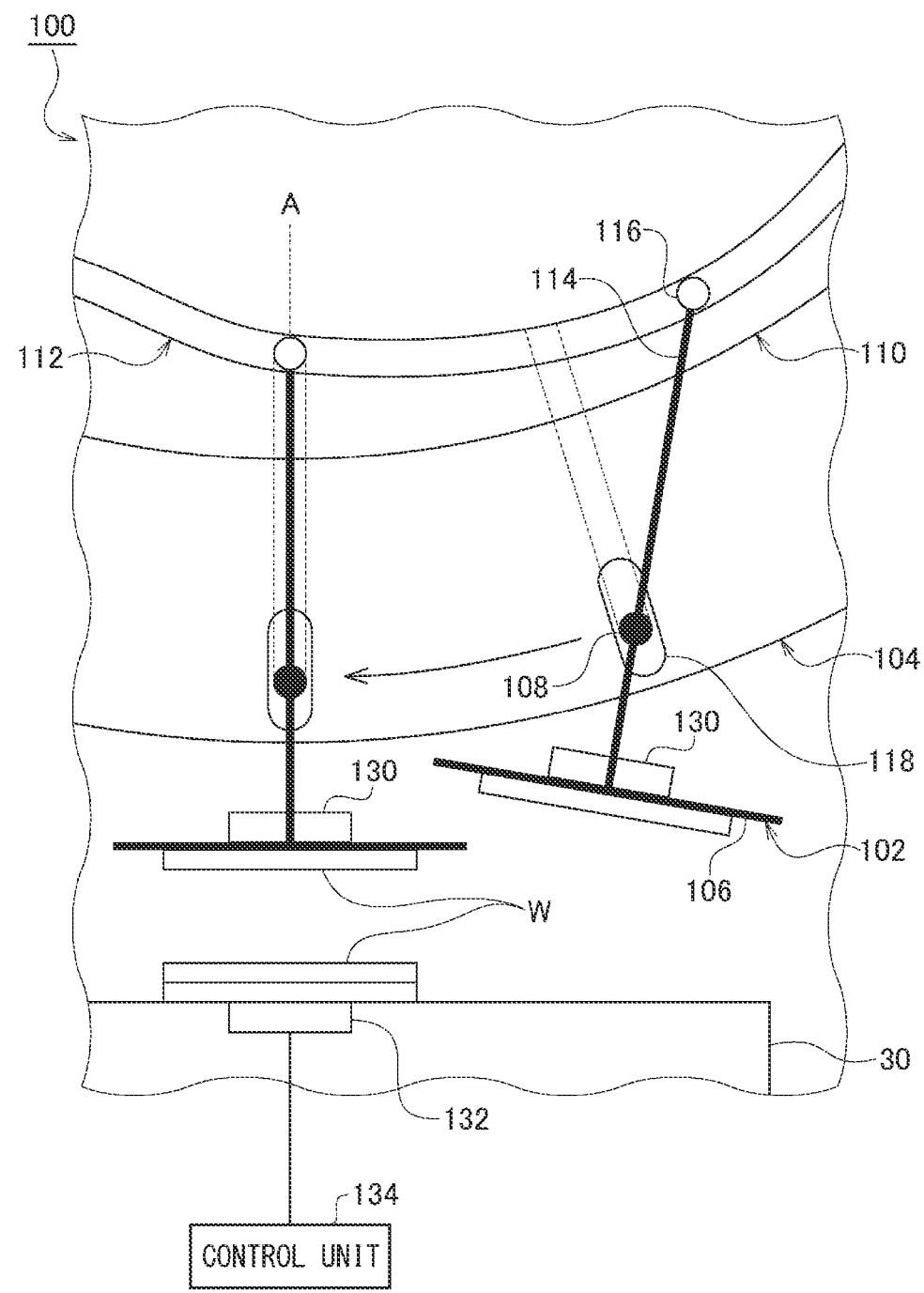
FIG. 7 is a diagram schematically showing a vibration suppression mechanism for suppressing the vibration of the holding surface by using the third attraction section and the fourth attraction section.

FIG. 7 is a diagram schematically showing a vibration suppression mechanism for suppressing the vibration of the holding surface 106 by using the third attraction section 130 and the fourth attraction section 132. The mechanism for suppressing the vibration of the holding surface 106 may utilize attraction of the third attraction section 130 and the fourth attraction section 132 in place of or in addition to utilizing adsorption of the first attraction section 122 and the second attraction section 124 or utilizing repulsion of the first repulsion section 126 and the second repulsion section 128.

In other words, the laminating device 100 of this embodiment includes the third attraction section 130 and the fourth attraction section 132 that attract each other. The third attraction section 130 is provided in each laminating head 102. The fourth attraction section 132 is provided in the lamination stage 30. Preferably, the fourth attraction section 132 is provided at a position in the lamination stage 30 aligned with (facing), when each laminating head 102 is at the laminating position A, the third attraction section 130 provided in the laminating head 102. The "position aligned" mentioned above is a position at which alignment occurs in the direction in which the laminating device 100 and the lamination stage 30 are arranged.

For example, the third attraction section 130 and the fourth attraction section 132 are magnets or electromagnets. Further, the third attraction section 130 and the fourth attraction section 132 have opposite polarities. The third attraction section 130 provided in the laminating head 102 at the laminating position A and the fourth attraction section 132 attract each other. This stabilizes the attitude of the laminating head 102 when the laminating head 102 is halted. Accordingly, the vibration of the holding surface 106 can be suppressed more successfully. When the fourth attraction section 132 is a magnet or an electromagnet, the third attraction section 130 may be a ferromagnetic body. When the third attraction section 130 is a magnet or an electromagnet, the fourth attraction section 132 may be a ferromagnetic body.

The cam mechanism allows the laminating head 102 to swing against the attractive force of the third attraction section 130 and the fourth attraction section 132. Even when an attractive force is produced between the third attraction section 130 and the fourth attraction section 132, therefore, the laminating head 102 can assume any attitude determined by the cam mechanism. In a more preferable configuration, the third attraction section 130 is a magnet, an electromagnet, or a ferromagnetic body, and the fourth attraction section 132 is an electromagnet. The magnetic force of the fourth attraction section 132 is lowered as each laminating head 102 leaves the laminating position A. This allows each laminating head 102 to leave the laminating position A more smoothly. Further, only the fourth attraction section 132 is subject to switching between magnetization and demagnetization so that smooth movement of each laminating head 102 can be realized with a simple control structure.

Adjustment of the magnetic force of the fourth attraction section 132, i.e., switching between conduction and non-conduction of an electric current in the fourth attraction section 132 can be executed by a control unit 134. FIG. 7 depicts the control unit 134 as a functional block. The functional blocks may be implemented by an element such as a CPU or memory of a computer or by a circuit as a hardware configuration, and by a computer program or the like as a software configuration. It will be understood by those skilled in the art that these functional blocks may be implemented in a variety of forms by combinations of hardware and software. The control unit 134 can control current conduction in the fourth attraction section 132 based on a preset operation program. The control unit 134 can switch between conduction and non-conduction equally in the case the first attraction section 122, the second attraction section 124, the first repulsion section 126, or the second repulsion section 128 is constituted by an electromagnet.

As described above, a laminating device 100 according to the embodiment includes: a plurality of laminating heads 102 that each holds the unit laminated body W; a drum section 104 in which the plurality of laminating heads 102 are arranged, which holds each laminating head 102 swingably via a support shaft 108, and which rotates to advance each laminating head 102 to a laminating position A facing the lamination stage 30; a cam section 110 which is in contact with each laminating head 102 and which causes each laminating head 102 to swing around the support shaft 108 in association with a movement of each laminating head 102 caused by a rotation of the drum section 104; and a biasing member 120 that biases each laminating head 102 in a radial direction of the drum section 104.

In accordance with this, vibration of the holding surface 106 produced when the laminating head 102 is halted at the laminating position A can be suppressed. As a result, misalignment of the unit laminated body W can be suppressed so that the quality of the laminated electrode assembly can be improved. Further, reduction in the battery capacity can be suppressed as compared with the case in which a through hole for prevention of lamination misalignment is provided in the electrode plate. It is also possible to avoid a decrease in the battery performance caused by damage to the electrode plate or exfoliation of the active material. Accordingly, the battery performance can be improved. Further, the unit laminated body W can be discharged onto the lamination stage 30 with high positional accuracy without halting the rotation of the drum section 104 so that the quality of battery can be improved and the lead time can be improved.

The cam section 110 of the embodiment does not follow the rotation of the drum section 104 and includes a cam groove 112 that extends in a circumferential direction of the drum section 104. Each laminating head 102 includes a projecting section 116 engaged with the cam groove 112, and each laminating head 102 swings around the support shaft 108 as the projecting section 116 moves along the cam groove 112 according to the rotation of the drum section 104. The biasing member 120 presses the projecting section 116 against a side surface of the cam groove 112. This can suppress the vibration of the holding surface 106 more successfully.

The laminating device 100 according to the embodiment further includes: a first attraction section 122 provided in each laminating head 102; and a second attraction section 124 provided at a position in the drum section 104 aligned with, when each laminating head 102 is at the laminating position A, the first attraction section 122 of the laminating head 102, wherein the first attraction section 122 of the laminating head 102 at the laminating position A and the second attraction section 124 corresponding thereto attract each other. This can suppress the vibration of the holding surface 106 more successfully.

The laminating device 100 according to the embodiment further includes: a first repulsion section 126 provided in each laminating head 102; and a second repulsion section 128 provided at a position in the drum section 104 displaced, when each laminating head 102 is at the laminating position A, from the first repulsion section 126 of the laminating head 102, wherein the first repulsion section 126 of the laminating head 102 at the laminating position A and the second repulsion section 128 corresponding thereto are repulsive to each other. This can suppress the vibration of the holding surface 106 more successfully.

The laminating device 100 according to the embodiment further includes: a third attraction section 130 provided in each laminating head 102; and a fourth attraction section 132 provided in the lamination stage 30, wherein the third attraction section 130 of the laminating head 102 at the laminating position A and the fourth attraction section 132 attract each other. This can suppress the vibration of the holding surface 106 more successfully. Preferably, the third attraction section 130 is a magnet, an electromagnet, or a ferromagnetic body, and the fourth attraction section 132 is an electromagnet. A magnetic force of the fourth attraction section 132 is lowered as each laminating head 102 leaves the laminating position A. This allows the laminating head 102 to leave the laminating position A more smoothly.

Embodiments of the present disclosure have been described above in detail. The embodiments described above are merely specific examples of practicing the present disclosure. The details of the embodiments shall not be construed as limiting the technical scope of the present disclosure. A number of design modifications such as modification, addition, deletion, etc. of constituting elements may be made to the extent that they do not depart from the idea of the invention defined by the claims. New embodiments with design modifications will provide the combined advantages of the embodiment and the variation. Although the details subject to such design modification are emphasized in the embodiments by using phrases such as "of this embodiment" and "in this embodiment", details not referred to as such are also subject to design modification. Any combination of constituting elements included in the respective embodiments is also useful as an embodiment of the present disclosure. Hatching in the cross section in the drawings should not be construed as limiting the material of the hatched object.

The invention claimed is:

1. A laminating device adapted to discharge a unit laminated body in which a separator and an electrode plate are laminated onto a lamination stage and to laminate a plurality of unit laminated bodies, comprising:
   a plurality of laminating heads that each holds one of the plurality of unit laminated bodies;

a drum section in which the plurality of laminating heads are arranged, which holds each laminating head swingably via a support shaft, and which rotates to advance each laminating head to a laminating position facing the lamination stage;

a cam section which is in contact with each laminating head and which causes each laminating head to swing around the support shaft in association with a movement of each laminating head caused by a rotation of the drum section; and a biasing member that biases each laminating head in a radial direction of the drum section.

2. The laminating device according to claim 1, wherein
the cam section does not follow the rotation of the drum section and includes a cam groove that extends in a circumferential direction of the drum section, each laminating head includes a projecting section engaged with the cam groove, and each laminating head swings around the support shaft as the projecting section moves along the cam groove according to the rotation of the drum section, and the biasing member presses the projecting section against a side surface of the cam groove.

3. The laminating device according to claim 1, further comprising:

a first attraction section provided in each laminating head; and a second attraction section provided at a position in the drum section aligned with, when each laminating head is at the laminating position, the first attraction section of each laminating head, wherein the first attraction section of each laminating head at the laminating position and the second attraction section corresponding to the first attraction section attract each other.

4. The laminating device according to claim 1, further comprising:

a first repulsion section provided in each laminating head; and a second repulsion section provided at a position in the drum section displaced, when each laminating head is at the laminating position, from the first repulsion section of each laminating head, wherein the first repulsion section of each laminating head at the laminating position and the second repulsion section corresponding to the first repulsion section are repulsive to each other.

5. The laminating device according to claim 1, further comprising:

a first attraction section provided in each laminating head; and a second attraction section provided in the lamination stage, wherein the first attraction section of each laminating head at the laminating position and the second attraction section attract each other.

6. The laminating device according to claim 5, wherein
the first attraction section is a magnet, an electromagnet, or a ferromagnetic body, the second attraction section is an electromagnet, and a magnetic force of the second attraction section is lowered as each laminating head leaves the laminating position.

* * * * *